(12) United States Patent
Lu (10) Patent No.: US 7,149,808 B2
(45) Date of Patent: Dec. 12, 2006

(54) APPLICATION PROTOCOL OFFLOADING

(75) Inventor: Lawrence T. Lu, San Jose, CA (US)

(73) Assignee: Array Networks, Inc., Milpitas, CA (US)

( * ) Notice: Subject to any disclaimer, the term of this patent is extended or adjusted under 35 U.S.C. 154(b) by 823 days.

(21) Appl. No.: 10/345,123

(22) Filed: Jan. 14, 2003

(65) Prior Publication Data

US 2003/0154298 A1    Aug. 14, 2003

Related U.S. Application Data (60) Provisional application No. 60/347,246, filed on Jan. 14, 2002.

(51) Int. Cl.
*G06F 13/00* (2006.01)
(52) U.S. Cl. .................... 709/230; 709/203; 370/395.5
(58) Field of Classification Search ................ 709/230, 709/203; 370/395.5
See application file for complete search history.

(56) References Cited

U.S. PATENT DOCUMENTS

| | | | |
|---|---|---|---|
| 5,521,591 A | | 5/1996 | Arora et al. |
| 6,094,674 A | * | 7/2000 | Hattori et al. ............... 709/203 |
| 6,108,703 A | | 8/2000 | Leighton et al. |
| 6,192,417 B1 | | 2/2001 | Block et al. |
| 6,212,560 B1 | | 4/2001 | Fairchild |
| 6,223,209 B1 | | 4/2001 | Watson |
| 6,246,683 B1 | | 6/2001 | Connery et al. |
| 6,253,230 B1 | | 6/2001 | Couland et al. |
| 6,263,368 B1 | | 7/2001 | Martin |
| 6,266,335 B1 | | 7/2001 | Bhaskaran |
| 6,273,622 B1 | | 8/2001 | Ben-David |
| 6,282,569 B1 | | 8/2001 | Wallis et al. |
| 6,640,278 B1 | * | 10/2003 | Nolan et al. .................... 711/6 |
| 2004/0233910 A1 | * | 11/2004 | Chen et al. ............. 370/395.5 |

OTHER PUBLICATIONS

Rabinovich, Michael, et al.; *DHTTP: An Efficient and Cache-Friendly Transfer Protocol for Web Traffic*. Proc. 20th Annual Joint Conf. of the IEEE Comp. and Comm. Societies; INFOCOM 2001; pp. 1597-1606; Apr. 2001.

* cited by examiner

*Primary Examiner*—Kenneth R. Coulter
(74) *Attorney, Agent, or Firm*—Buchanan Ingersoll & Rooney PC (57) ABSTRACT

In a network communication system involving a client and a server, communications are separated and forwarded into multiple subsystems for processing independently and concurrently. A protocol offloading system for processing information transmitted between a client and a server is provided. The protocol offloading system includes a first subsystem for processing protocol information and a second subsystem, independent of the first subsystem, for processing the actual data.

8 Claims, 6 Drawing Sheets

Application Protocol Offloading System

APPLICATION PROTOCOL OFFLOADING

CROSS-REFERENCE TO RELATED APPLICATIONS

This application claims the benefits under 35 U.S.C. §119(e) of U.S. provisional patent application Ser. No. 60/347,246 filed Jan. 14, 2002.

BACKGROUND OF THE INVENTION

1. Field of the Invention

The present invention relates to web servers configured to process information requests from clients in client-server type applications.

2. Description of Related Art

Current web server architecture utilizes one system to process HTTP data (both requests and responses) and Ethernet, IP, TCP, and HTTP protocols. However, such an architecture does not scale because as the packet data is passed up the stack and processed, and each level of the stack is required to parse out the data that it needs from the original packet.

Conventional computer network architecture consists of three main sections. The first of these is the client software. Common examples are Microsoft Internet Explorer™ and Netscape Mozilla™ browsers for the HTTP protocol. The client software is the interface that is used to present the data or information to the user and is therefore under the full control of the user. Normally the client software issues requests to the Web server via the neck of communication mechanism for the data that the user desires to see. However, before the HTTP session can be established, low level protocols are used to establish the communication channel thereby providing HTTP with the reliable protocol transport that it requires.

The second main section is a communication mechanism in place to provide a reliable transport of information and data between the client software and server software. Fault-tolerant protocols are used to transfer the requests and responses, normally as part of a session between the client and server software. The network is made up of a physical communication mechanism that today is constructed from either copper or fiber cables. The cables carry the signals that are generated by the network connection equipment. The network connection equipment converts the protocols in use today to the low level signals that are needed to transfer the data across the physical connection.

The third main section of network architecture is the server software. There are many examples of server software in use today; however, for HTTP, Microsoft's™ IIS Web server and the open software foundations' Apache Web™ server are the dominant solutions in use today. The application-specific server software generally resides on top of a general-purpose operating system that is capable of doing many things in a acceptable manner. However, it is generally not capable of providing the most efficient and high performance environment that would be optimal for the application. It is a trade-off between being able to do many things and being extremely efficient at a single task, or a number of smaller tasks. Because of these trade-offs, Web servers in use today are inefficient and do not provide the most cost-effective solution or even the best utilization of the computing resources that they consume.

The procedure and handshaking process is very well-defined and followed by all the vendors that make use of the Internet today, because most systems in use follow the same set of rules, and interoperability, at least at the protocol level, is assured.

Figure 1:
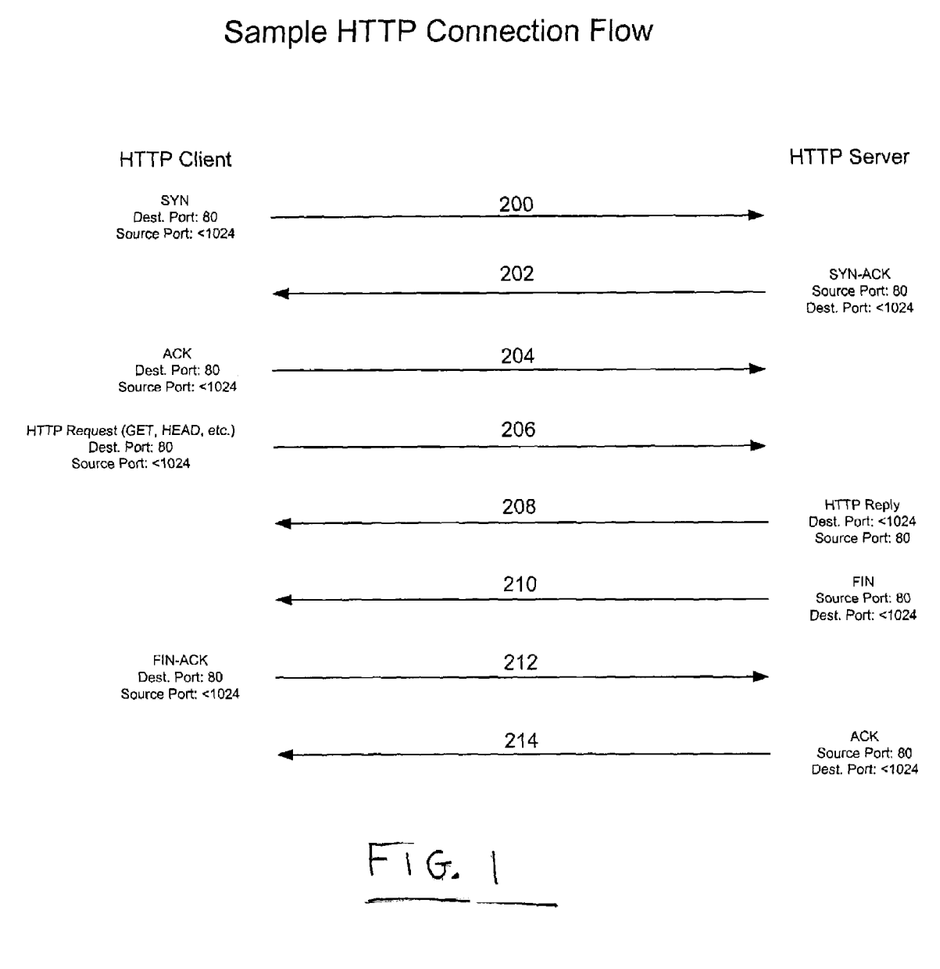
FIG. 1 is a diagram of an HTTP connection flow.

With reference to FIG. 1, the client follows what is referred to as a three-way TCP (Transmission Control Protocol) handshake procedure. The client sends (at 200) a SYN packet to the glistening port on the server. The server is required to acknowledge receipt of the SYN packet and acknowledges receipt by replying (at 202) with a SYN-ACK. When the client successfully receives the SYN-ACK it acknowledges that the server is ready to accept a connection and sets up a connection on the client. When the connection is successfully initialized it will send an ACK (204) back to the server indicating to the server that the client is now ready to request data 204. Once the three-way handshake is complete and a TCP connection has been established, the connection is ready to transfer application data, which in this example is an HTTP connection. The HTTP client will now send (206) a valid HTTP request for the data that is needed by the client. The server will reply (208) with the requested data. This sequence of events will continue until the client has all the data that was requested. To terminate the connection the server sends (210) a FIN packet to the client. The client acknowledges receipt of the FIN packet and the fact that the connection with the server needs to be terminated, by replying (212) to the server with a FIN-ACK acknowledgment packet. When the server receives the FIN-ACK it will terminate the connection with the client, and it can now release all the resources that were being used for the communication to the client, and reply (214) back to the client with an acknowledgment packet.

Although the above procedure is a very simple handshaking and simple request and response mechanism that is used to transfer the data, it is possible for the client to have multiple connections to multiple servers. As a result, the servers are forced to manage each of these connections in a very reliable fashion. The server is required to maintain the status of 14 fields in the case of IP (RFC 791) and 18 fields in the case of TCP (RFC 793), for each connection. This connection management function that the server is required to perform places a significant drain on the computing resources that could have been otherwise used for data management functions.

The present invention therefore seeks to free up the computing resources of servers by facilitating connection management.

BRIEF SUMMARY OF THE INVENTION

In accordance with the invention, a protocol offloading system for processing information transmitted between a client and a server is provided. The protocol offloading system includes a first subsystem for processing protocol information and a second subsystem, independent of the first subsystem, for processing the actual data.

Further in accordance with the invention, a method is provided for performing protocol offloading associated with communication of information between a client and a server, the method including identifying the protocol information for processing in a first subsystem, and processing the actual data in a second subsystem, independent of the first subsystem.

The invention may provide numerous benefits, including:

Reliability. Each of the handlers or brokers ensures that the data is valid and therefore only valid data is passed on to the next handler.

Flexibility. Because the system is event driven and fully pluggable, additional handlers can be written to handle new protocols or process existing protocols in a different manner.

Scalability Systems using this architecture are significantly more scalable. Not only are they able to process more data in less time but also with significantly less latency. This is achieved because the data does not have to be parsed to remove, modify or insert specific data. Rather, the data is passed to each handler as a data structure that does not need to be searched because it can be referenced by name or offset.

Efficiency. The invention allows the computer CPU and associated components to operate much more efficiently because it does not cause the CPU to context switch, makes full use of the CPU, interrupt controller and bus pipelining mechanisms.

Reduced Latency. Because the data is not required to be parsed, the data server can simply perform a lookup against the data in the data structure and therefore be able to process the data without delay.

Predictability. Because data parsing requires expensive lookups, when large amounts of data are being used, conventional systems become unpredictable. According to the invention, because the data server does not have to parse the content, it allows for the data server to have predictable data processing times, thereby allowing for excellent capacity planning and computer requirement forecasting.

BRIEF DESCRIPTION OF THE SEVERAL VIEWS OF THE DRAWING(S)

Many advantages of the present invention will be apparent to those skilled in the art with a reading of this specification in conjunction with the attached drawings, wherein like reference numerals are applied to like elements and wherein.

DETAILED DESCRIPTION OF THE INVENTION

Figure 2:
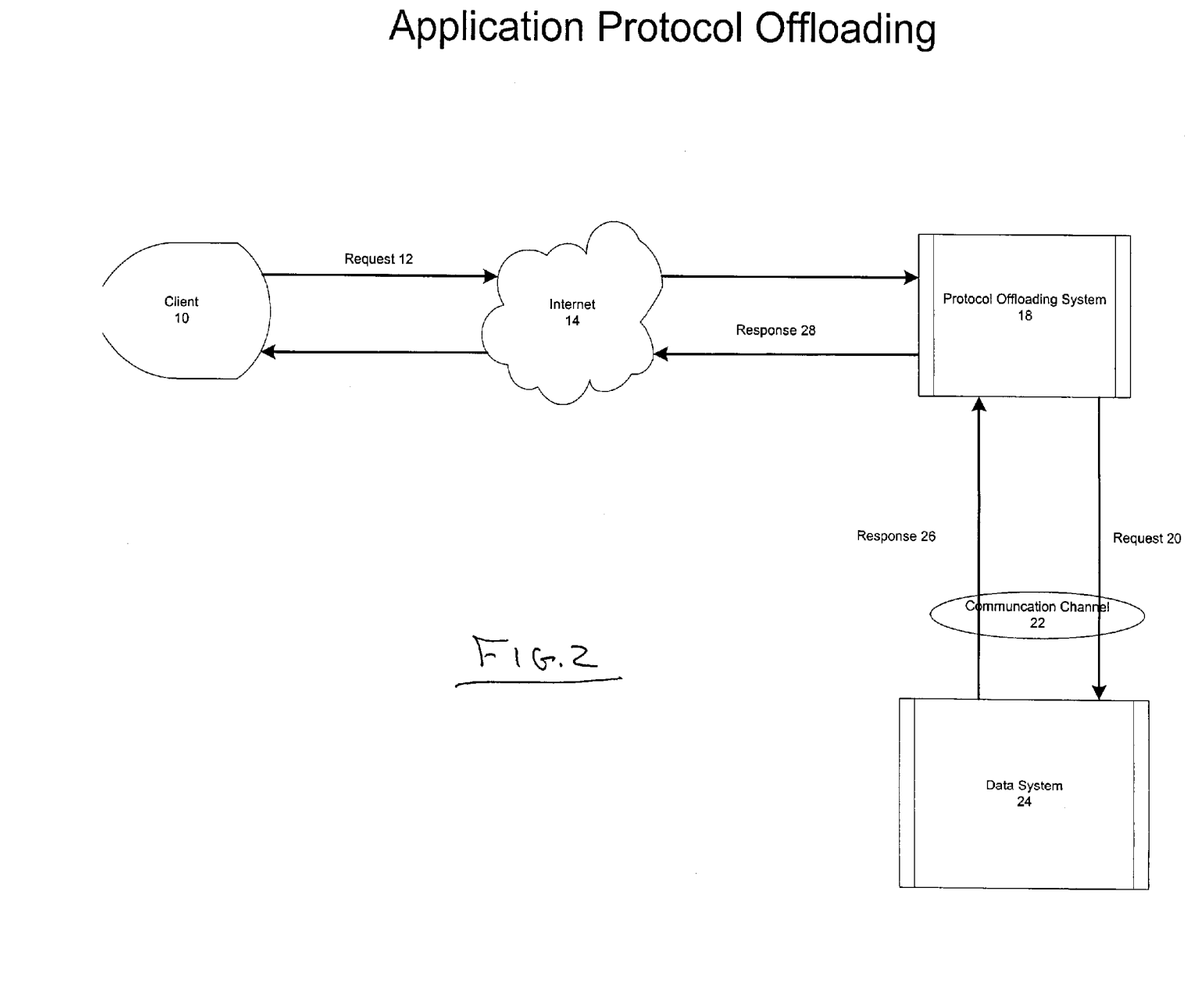
FIG. 2 is a schematic illustration of a system for application protocol offloading in accordance with the invention.

FIG. 1 is a schematic illustration of a system for application protocol offloading in accordance with the invention. Such a system provides the solution of separating the HTTP (Hypertext Transfer Protocol) processing (requests and responses) into multiple subsystems for processing independently and concurrently. While described in terms of HTTP, it is to be understood that the invention is applicable to other application level protocols, such as FTP, SMTP, XML, streaming media, and so forth.

A request 12 for information originates with a client 10, and is sent, via a network such as Internet 14, to a protocol offloading system 18. The protocol offloading system 18, which can be a combination of other protocol subsystems (not shown) in which one or multiple protocols are processed, processes the Ethernet, IP, TCP and HTTP protocols of the request. The processed request is then forwarded, as a pre-processed request, to separate data system 24, via communication channel 22. Examples of possible bus architectures used as communication channels are PCIX, InfiniBand, and Hypertransport. Examples of networks are internal networks, such as Ethernets, ATMs and so forth.

The data system 24 processes the actual data—that is, the request and the subsequent response. The data system 24 then sends a response, without any protocol information, back to the protocol offloading system 18, via communication channel 22. The protocol offloading system 18 appends the protocol information to the response it receives from the data system 24, and sends its response (28) to the client 10, via network 14. Information transferred between the protocol offloading system 18 and the data system 24 may be encrypted. Further, the information may be grouped—for example multiple requests or responses being sent in a single packet or stream. Alternatively, the information may be sent in packets or streams each corresponding to a single request or response. It is also contemplated that multiple protocol offloading systems 18 can be connected with multiple data systems 24.

The mechanism to improve the scalability of the current network architecture in accordance with the invention is the offloading of the protocol-specific processing mechanisms. The protocol offloading system 18 needs only to communicate the required data to the data system 24, and thereby provide the scalability that is needed by the higher processing needs of today's enterprise customers.

No changes are required on the client end, and therefore the solution of the invention can be easily implemented without any changes to the current installed base. The client 10 issues a simple HTTP request for data via existing communication mechanisms that will transfer the request to the protocol offloading system 18. The protocol offloading system 18 provides all the protocol-specific mechanisms that are required to communicate with the client 10 over the existing network.

Figure 3:
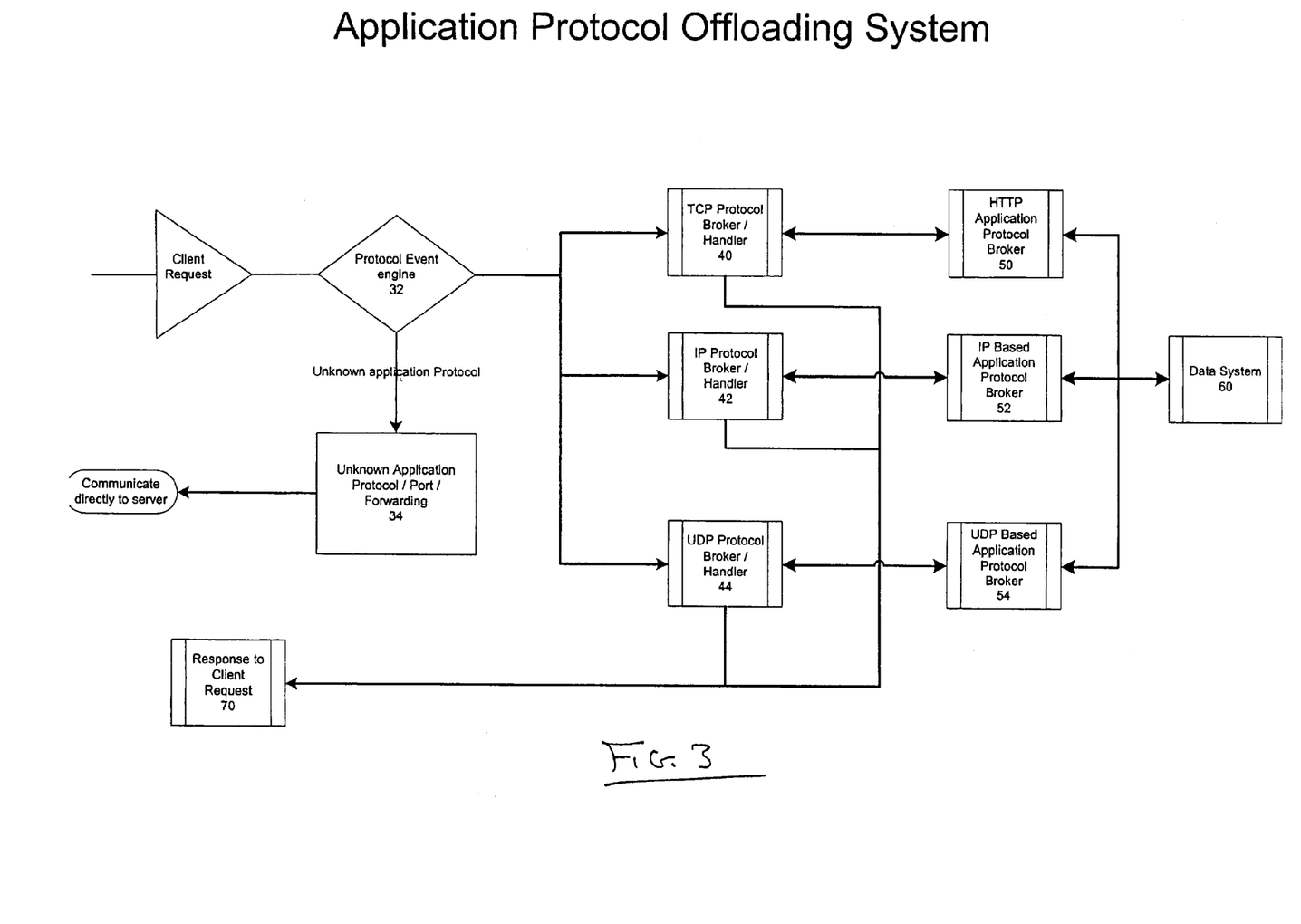
FIG. 3 is a flow diagram of an application protocol offloading system in accordance with the invention.

FIG. 3 schematically shows the protocol offloading system, comprising a protocol event engine 32, which is the entry point for all client requests. The event engine 32 is responsible for directing requests from the client to a relevant protocol broker or handler, for example TCP Protocol broker/handler 40, IP Protocol broker/handler 42, or UDP Protocol broker/handler 44. Other protocols are also possible, and appropriate brokers/handlers are provided therefor. In the case that the protocol is unknown, the protocol event engine 32 sends the packet to a forwarding agent 34 without any modification, and direct communication with the server is established.

To provide a scalable and flexible architecture, each protocol will make use of its own protocol broker/handler (40, 42, 44) that has specific knowledge required for that protocol. Each broker/handler can then simply register with the protocol event engine 32, and as part of the registration process, provide the protocol engine with the specific details that it needs to provide the event services and guarantee that all packets that conform to a prescribed rule set will be directed to that protocol broker/handler, thereby ensuring that the correct protocol packets are all sent to the correct broker. To ensure that data integrity is maintained, client requests are validated against the registered protocol brokers or handlers in protocol event engine 32. In the case of a client request using an unregistered protocol, the request will simply be forwarded directly to the application server 34. An important function of the broker/handler is to populate the data structures with the protocol-specific information.

When the lower-level protocol issues have been addressed by the protocol broker/handlers 40, 42, 44, the relevant data is passed on to application protocol brokers, such as for example HTTP Application Protocol Broker 50, IP-based Application Protocol Broker 52, and UDP-based Application Protocol Broker 54. It is the responsibility of the application protocol broker 50, 52, 54 to take the data structure as populated by the protocol broker/handler 40, 42, 44 and add to it the HTTP protocol-specific data, and then to place it on the queue or generate the event so that the data system 60 can access the data. The process is then reversed, and the response to the client request is sent, at process 70.

Each application protocol broker is required to understand the application protocol nuances and specifics. Therefore, although the architecture its modular and provides a simple interface for new application brokers to be written and registered, an HTTP application protocol handler will be discussed for this invention.

Figure 4:
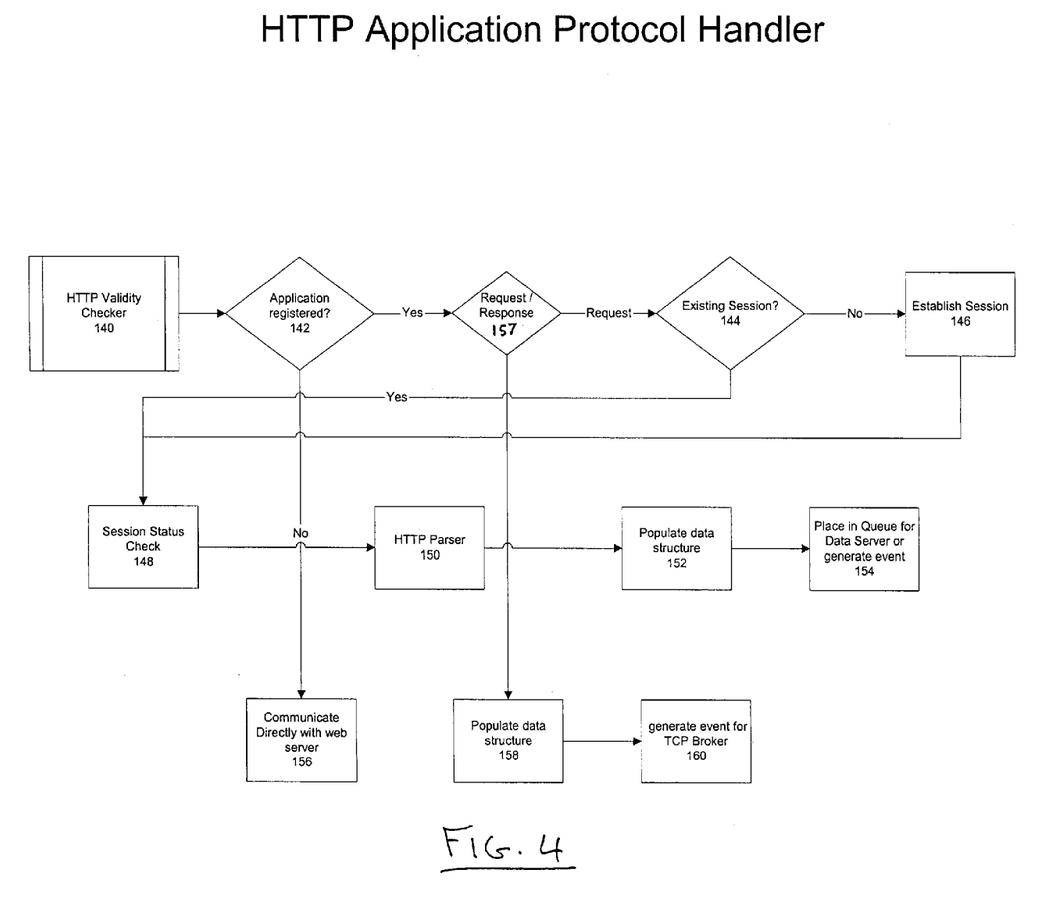
FIG. 4 is a flow diagram of the operation of an HTTP application protocol handler in accordance with the invention.

Referring to FIG. 4, to maintain a high level of data integrity, the packet data is verified at 140 to ascertain compliance with the strict HTTP rules as defined with the RFC. If a data service has registered with the HTTP application handler 142, it is determined at 157 if this valid HTTP packet is a request or response. Otherwise direct communication with the server is established (156). If it is a request the protocol handler determines if this is a new or existing session (at 144), and if it is a new session, any application specific and checking is completed at 146. Various security specific functions, such as authentication mechanisms, are activated here. The session status is verified 148 before the packet is parsed to gather HTTP data at 150 so that the data structure can be populated with the HTTP data (152) in order for an event to be generated (154) to wake up the data system. The data is placed on a queue for processing by the data system 154. If the data is a response, the data structure is populated at 158, and the event generated at 160.

Figure 5:
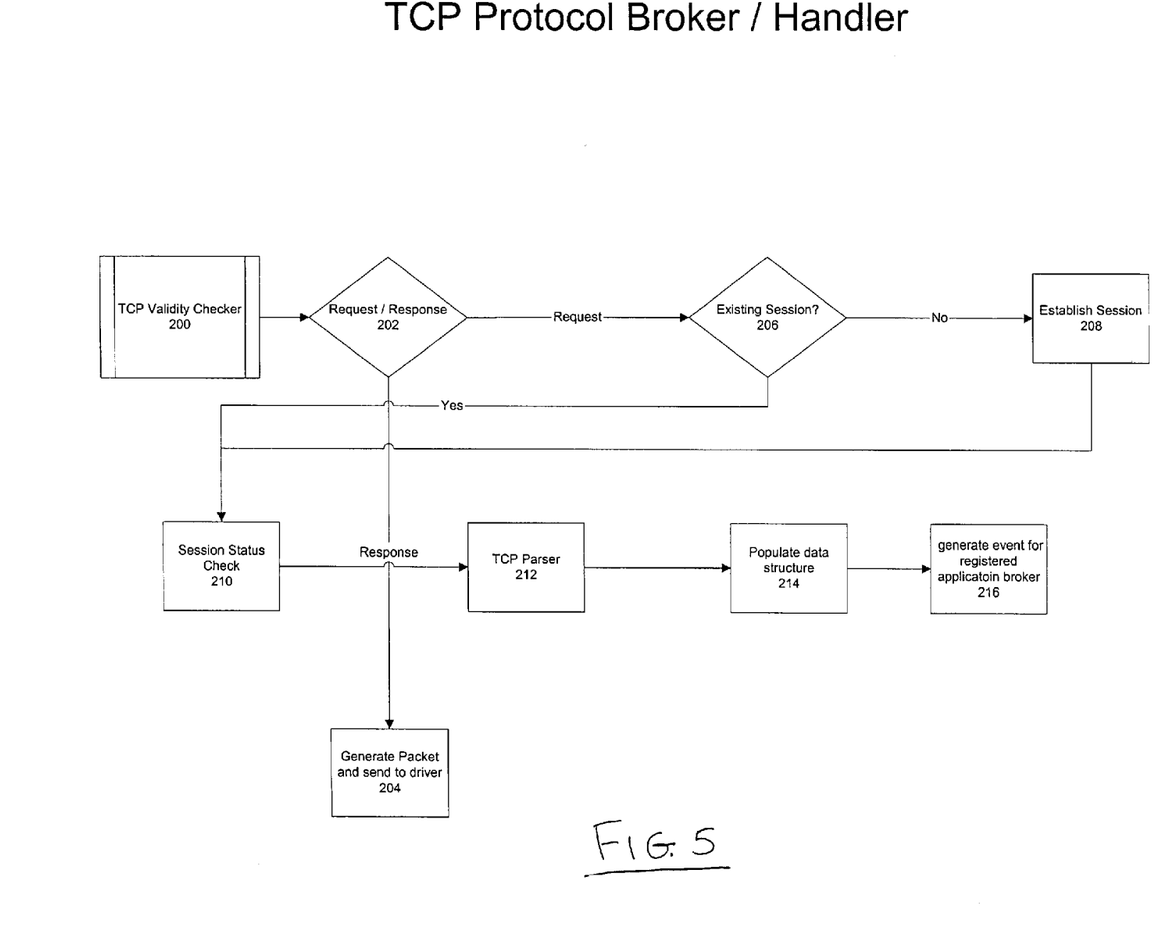
FIG. 5 is a flow diagram of the operation of a TCP protocol broker/handler in accordance with the invention.

FIG. 5 shows the operation of the TCP protocol broker/handler mechanism. The broker/handler is responsible for the protocol-specific error and validity checking (200), and data structure population (214). If a determination at 206 of an existing session is made, then a status check 210 is performed. Otherwise a session is established first, at 208. Parsing is performed at 212, data structure population at 214, and an event generated at 216. Packet generation is also performed at 204. It will be appreciated that TCP is discussed here, but as shown in the application protocol offloading system flow diagram (FIG. 3), other protocols such as IP 42 and UDP 44 can easily be accommodated simply by creating the appropriate protocol handler and registering with the application protocol offloading system.

The application protocol offloading system ensures that only valid requests are received directly to the protocol event engine 32. Even so, the TCP protocol broker is required to perform, at 200, protocol specific checks to ensure the data integrity and validity of the packet received. It is then determined if the data structure needs to be populated from the packet contents or if the packet needs to be grated from the data structure. In the case of a client request having been received from the client, it needs to be determined if any protocol specific actions need to be taken. In the case of TCP a three-way handshake needs to be completed as discussed above, so the TCP broker checks to see if this is an existing session (at 206), and if it is not, completes the TCP handshake (at 208) as defined in the RFC. If this is a new session, or an existing session, the status of the session is verified by the session status check function 210. TCP packet is parsed 212 and data that was gathered is used to populate the data structure 214. An event is generated for the correct application broker at 216.

Figure 6:
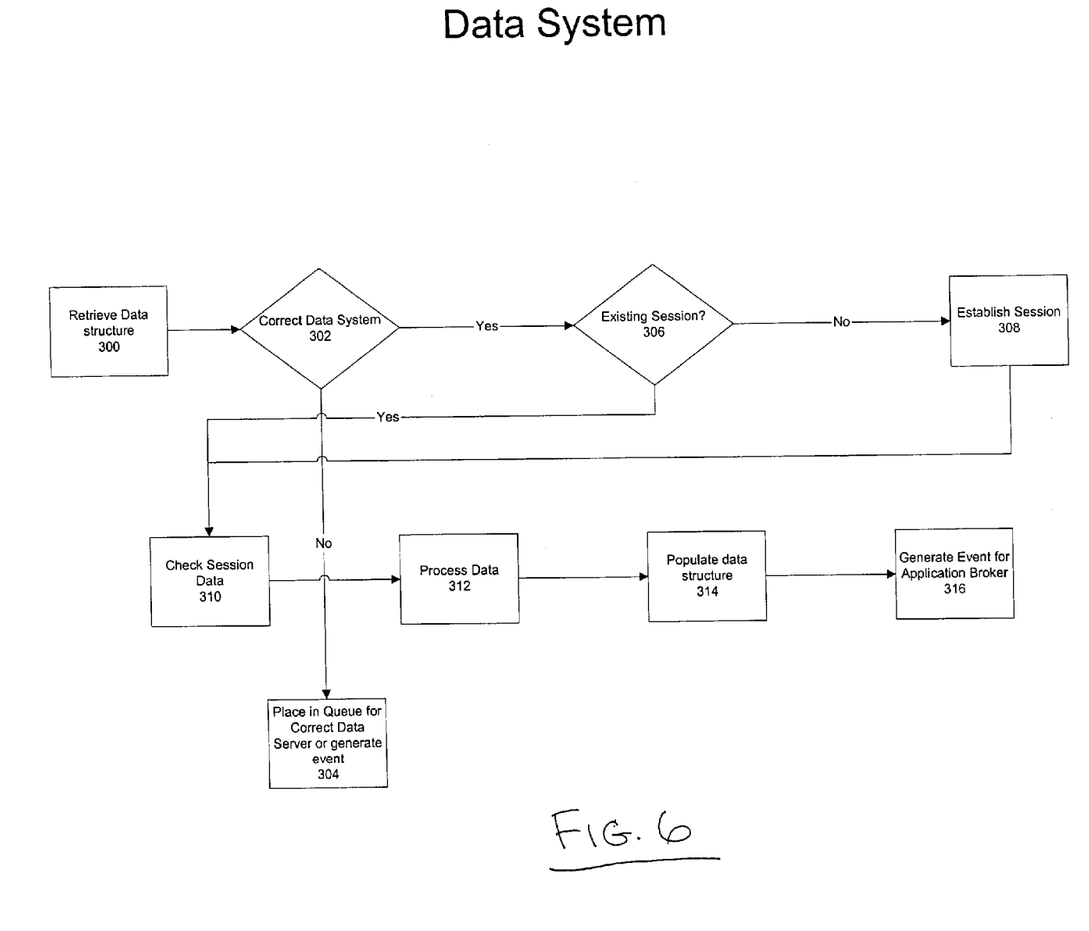
FIG. 6 is a flow diagram of the operation of a data system in accordance with the invention.

The operation of the data system is discussed with reference to FIG. 6. The data system is an application-specific processing solution that is focused on solving the business issues on hand without the distractions of the low level protocol functions. Its operation is thus performed in a cost-effective, scalable manner with low latency, thereby providing the consumer of the business data logic the best possible experience. The data system, depending on its event registration data, will retrieve (at 300) any lower protocol data and ascertain, at 302, that the data contained in the data structure is in fact the data that the service can process. Depending on the application needs, it is possible that it requires an existing session with possible authentication and security verification that was completed by the HTTP protocol handler 148, and the state and associated data would be retrieved from the data structure. If necessary, as determined at 306, a new session is established (308) using the new session data from the data structure as created by the HTTP protocol handler. The data system verifies (310) that all the session data collected is valid and can be used for processing. The business logic uses the data from the data structure 312 to complete its desired tasks and to deliver the business logic. The business logic response is populated into the data structure 314 and then an event is generated (at 316) so that the response data can be processed by the HTTP protocol handler. Information can be place in queue for correct data server to generate event at 304.

Tables 1–13 below illustrate various data structures for reference.

TABLE 1

Registration data structure

| Field name | Data Type | Data Size | Mandatory |
|---|---|---|---|
| Timestamp | time_t | — | Y |
| Flow | small integer | Boolean | Y |
| Low-Protocol | Small integer | Boolean | Y |
| Application Protocol | Small integer | Boolean | Y |
| Access | Small Integer | Boolean | Y |
| Protocol Handler ID | Int | — | Y |
| Application Handler | Int | — | Y |
| Application Data | Int | — | Y |

TABLE 2

HTTP Common Data Structure

| Field Name | Data Type | Size | Mandatory |
|---|---|---|---|
| Hash | String | 64 | Y |
| Source IP | Integer | 32 | Y |
| Destination IP | Integer | 32 | Y |
| Cache-control | Structure | — | N |
| Date | Date | — | N |
| Pragma | String | 128 | N |
| Trailer | String | 128 | N |
| Transfer-encoding | String | 48 | N |
| Upgrade | String | 128 | N |
| Via | Structure[16] | — | N |
| Warning | Structure | — | N |

TABLE 3

HTTP Request Data Structure

| Field Name | Data Type | Size | Mandatory |
|---|---|---|---|
| Hash | String | 64 | Y |
| HTTP Method | Small Integer | 1 | Y |
| URL | String | 256 | Y |
| Accept | String | 128 | N |
| Accept-charset | String | 48 | N |
| Accept-encoding | String | 128 | N |
| Accept-Language-Primary | String | 8 | N |
| Accept-Language-Secondary | String | 8 | N |
| Authorization | String | 256 | N |
| Expect | String | 256 | N |
| From | String | 128 | N |
| Host | String | 128 | N |
| If-match | String | 128 | N |
| If-Modified-since | Date | — | N |
| If-none-match | String | 128 | N |
| If-Range | String | 128 | N |
| If-Unmodified-since | Date | — | N |
| Max-forwards | Int | 1 | N |
| Proxy-authorization | String | 256 | N |
| Range | Structure | — | N |
| Referrer | String | 256 | N |
| TE | String | 128 | N |
| User-agent | String | 128 | Y |
| Data Length | Int | — | Y |
| Data | String | Variable | N |

TABLE 4

HTTP Response Data Structure

| Field Name | Data Type | Size | Mandatory |
|---|---|---|---|
| Status Line | String | 128 | Y |
| Accept-Ranges | Int | Boolean Flag | N |
| Age | Long Int | — | N |
| Etag | String | 128 | N |
| Location | String | 128 | N |
| Proxy-Authenticate | String | 256 | N |
| Retry-After | String | 48 | N |
| Server | String | 128 | N |
| Vary | String | 128 | N |
| WWW-Authenticate | String | 128 | N |
| Allow | Int | Boolean Flag | N |
| Content-encoding | String | 128 | N |
| Content-Language | String | 48 | N |
| Content-Length | Long Int | — | N |
| Content-Location | String | 256 | N |
| Content-MD5 | String | 128 | N |
| Content-Range | Structure | — | N |
| Content-Type | String | 48 | N |
| Expires | Date | — | N |
| Last-Modified | Date | — | N |
| Extension header | String | Variable | N |
| Data Length | int | — | Y |
| Data | String | Variable | N |

TABLE 5

Flow Values

| | |
|---|---|
| Request | 1 |
| Response | 2 |
| Bi-directional | 3 |

TABLE 6

Access Values

| | |
|---|---|
| Event | 0 |
| Queue | 1 |

TABLE 7

Protocol Values B
Boolean

| | |
|---|---|
| IP | 1 |
| TCP | 2 |
| UDP | 3 |
| Multi-cast UDP | 4 |
| HTTP | 5 |

TABLE 8

HTTP Method Values
Boolean

| | |
|---|---|
| GET | 1 |
| HEAD | 2 |
| POST | 3 |
| CONNECT | 4 |
| PUT | 5 |
| DELETE | 6 |
| TRACE | 7 |
| OPTIONS | 8 |

TABLE 9

Cache-Control Request

| Field Name | Type | Size |
|---|---|---|
| No-cache | Boolean | — |
| No-store | Boolean | — |
| Max-age | Long Int | — |
| Max-stale | Long Int | — |
| Min-fresh | Long Int | — |
| No-transform | Boolean | — |
| Only-if-cached | Boolean | — |
| Cache-extension | String | 128 |

TABLE 10

Cache-Control Response

| Field Name | Type | Size |
|---|---|---|
| Public | Boolean | — |
| Private | Boolean | — |
| No-cache | Boolean | — |
| No-store | Boolean | — |
| No-transform | Boolean | — |
| Must-validate | Boolean | — |
| Proxy-revalidate | Boolean | — |
| Max-age | Long Int | — |

TABLE 10-continued

Cache-Control Response

| Field Name | Type | Size |
| --- | --- | --- |
| s-maxage | Long Int | — |
| Cache-extension | String | 128 |

TABLE 11

Content MD5

| Field Name | Type | Size |
| --- | --- | --- |
| Byte-content-unit | String | 16 |
| Byte-content-range-resp | Long Int | — |
| Byte-content-range-length | Long Int | — |
| Byte-range-first-byte | Long Int | — |
| Byte-range-last-byte | Long Int | — |
| Instance-Length | Int | — |

TABLE 12

Via

| Field Name | Type | Size |
| --- | --- | --- |
| Received Protocol | String | 8 |
| Received Protocol-Version-Maj | String | 2 |
| Received Protocol-Version-Min | String | 2 |
| Received By | String | 48 |
| Pseudonym | String | 256 |

TABLE 13

Warning

| Field Name | Type | Size |
| --- | --- | --- |
| Warn-code | String | 3 |
| W-agent | String | 128 |
| Warn-text | String | 128 |
| Warn-Date | Date | — |

The invention claimed is:

1. A protocol offloading system for processing information transmitted between a client and a server, the information containing protocol information and actual data, the protocol offloading system comprising:
a first subsystem for processing the protocol information, wherein the first subsystem contains multiple protocol handlers each dedicated to a specific protocol; and
a second subsystem, independent of the first subsystem, for processing the actual data;
a protocol event engine for receiving a request from a client and directing the request to an appropriate one of the multiple handlers, wherein the protocol event engine forwards requests which cannot be mapped to an appropriate one of the multiple handlers directly to the server.

2. The system of claim 1, wherein the first and second subsystems are separate computers communicating on a bus or network.

3. The system of claim 1, wherein the protocol is HTTP.

4. The system of claim 1, wherein the protocol is selected from the group consisting of FTP, SMTP, XML.

5. A method for performing protocol offloading associated with communication of information between a client and a server, the information containing protocol information and actual data, the method comprising:
identifying the protocol information for processing in a first subsystem, wherein the first subsystem is one of multiple protocol handlers each dedicated to a specific protocol; and
processing the actual data in a second subsystem, independent of the first subsystem;
receiving a request from a client and directing the request to an appropriate one of the multiple handlers; and
forwarding requests which cannot be mapped to an appropriate one of the multiple handlers directly to the server.

6. The method of claim 5, wherein the first and second subsystems are separate computers communicating on a bus or network.

7. The method of claim 5, wherein the protocol is HTTP.

8. The method of claim 5, wherein the protocol is selected from the group consisting of FTP, SMTP, XML.

* * * * *